US011330353B1

(12) United States Patent
Perkins (10) Patent No.: US 11,330,353 B1
(45) Date of Patent: May 10, 2022

(54) DUAL-ARM RADIO HEADSET

(71) Applicant: Chris Perkins Enterprises LLC, North Bay Village, FL (US)

(72) Inventor: Christopher Alan Perkins, North Bay Village, FL (US)

(73) Assignee: Chris Perkins Enterprises LLC, North Bay Village, FL (US)

( * ) Notice: Subject to any disclaimer, the term of this patent is extended or adjusted under 35 U.S.C. 154(b) by 0 days.

(21) Appl. No.: 17/196,612

(22) Filed: Mar. 9, 2021

(51) Int. Cl.
*H04R 1/10* (2006.01)
*H04R 1/08* (2006.01)
*H04M 1/05* (2006.01)
*A41D 13/11* (2006.01)

(52) U.S. Cl.
CPC ......... *H04R 1/086* (2013.01); *A41D 13/1161* (2013.01); *H04M 1/05* (2013.01); *H04R 1/083* (2013.01); *H04R 1/10* (2013.01); *H04R 1/105* (2013.01); *H04R 2201/107* (2013.01); *H04R 2499/11* (2013.01)

(58) Field of Classification Search
CPC ........ H04R 1/10; H04R 1/105; H04R 1/1058; H04R 1/008; H04R 1/1083; H04R 1/1086; H04R 2201/107; H04R 2499/11; H04R 1/08; H04R 1/083; H04R 1/086; H04M 1/05; H04M 1/19; H04M 1/6058
See application file for complete search history.

(56) References Cited

U.S. PATENT DOCUMENTS

| | | | |
|---|---|---|---|
| 1,561,760 A | 11/1925 | Whelan | |
| 4,374,301 A * | 2/1983 | Frieder, Jr. | H04M 1/05 379/430 |
| 5,697,363 A * | 12/1997 | Hart | A61M 16/06 128/201.19 |
| 8,155,368 B2 | 4/2012 | Cheung et al. | |
| 8,434,493 B1 * | 5/2013 | McGhie | A41D 13/1161 128/863 |
| 8,996,382 B2 | 3/2015 | McClung, II | |
| 9,241,208 B2 | 1/2016 | Ball | |
| D792,377 S | 7/2017 | Humphreys | |

(Continued)

FOREIGN PATENT DOCUMENTS

| | | |
|---|---|---|
| CN | 105996229 A | 10/2016 |
| CN | 205624587 U | 10/2016 |

(Continued)

OTHER PUBLICATIONS https://www.prnewswire.com/news-releases/coaches-lips-are-sealed-with-island-inventors-boomguard-101972283.html, Sep. 1, 2010.

*Primary Examiner* — Huyen D Le
(74) *Attorney, Agent, or Firm* — Akerman LLP (57) ABSTRACT

A communications system includes a support band, a speaker, and two arms disposed on opposite ends of the support band. The speaker allows the user to receive radio communications. A first arm may comprise a communication subassembly, allowing for the user to send radio communications. The first and second arms may pivot about its connection to the support band. A second arm comprises a shield subassembly, whereby the shield subassembly may completely cover the mouth and nose of the user to prevent the exit and entrance of airborne particles. The shield assembly may comprise a medical-grade material disposed between two layers of plastic. The shield assembly may be disposable.

19 Claims, 8 Drawing Sheets

(56) References Cited

U.S. PATENT DOCUMENTS

| | | | |
|---|---|---|---|
| D813,202 S | 3/2018 | Johnson | |
| 10,172,398 B2* | 1/2019 | Saco | A41D 13/1161 |
| 10,542,339 B1* | 1/2020 | Ruth | H04R 1/086 |
| 2008/0304690 A1* | 12/2008 | Poindexter | H04R 1/08 |
| | | | 381/375 |
| 2010/0034412 A1 | 2/2010 | Parda | |
| 2010/0250231 A1* | 9/2010 | Almagro | G06F 40/58 |
| | | | 704/2 |
| 2016/0255432 A1 | 9/2016 | Casso Villareal | |
| 2019/0289109 A1 | 9/2019 | Umhoefer | |

FOREIGN PATENT DOCUMENTS

| | | |
|---|---|---|
| CN | 207011749 U | 2/2018 |
| JP | 2006222877 A | 8/2006 |
| JP | 6084748 B1 | 2/2017 |
| KR | 200210151 Y1 | 1/2001 |
| KR | 101160080 B1 | 7/2012 |
| KR | 101279046 B1 | 7/2013 |
| KR | 20140127489 A | 11/2014 |
| KR | 20200039282 A | 4/2020 |
| KR | 10-2121318 B1 | 6/2020 |
| RU | 187362 U1 | 3/2019 |
| WO | 02/37895 A1 | 5/2002 |
| WO | 02/65809 A1 | 8/2002 |
| WO | 2015/003239 A1 | 1/2015 |

\* cited by examiner

DUAL-ARM RADIO HEADSET

FIELD OF THE DISCLOSURE

This disclosure relates to radio headsets and more particularly a radio headset for covering a portion of a user's nose and/or mouth.

BACKGROUND OF THE INVENTION

Communication headset systems are used extensively in various industries to allow a user to remotely communicate with another user. Examples include the use of headsets in sports, whereby a coach may communicate with another coach in real-time to discuss plays, personnel and the like, or the use of headsets by restaurants, whereby a restaurant employee may take an order and communicate it to those in the kitchen.

Due to the prevalence of the transmission of viruses and other pathogenic microorganisms through airborne particles, the use of face coverings has become widespread in today's society, wherein many organizations and municipalities require use of such face coverings. Current designs of headsets do not allow for the dual use of both the headsets and face coverings nor do they allow for the ease between switching between the two. What is needed are communication systems that allow a user to easily switch between communicating via a headset and using a face covering.

SUMMARY

In one aspect, a communications headset system includes a first arm and a second arm pivotably attached to opposite ends of a support band. The support band is adapted to be secured about the head of a user. The communications headset system may further comprise a speaker positioned proximate to an ear of the user when the support band is secured to the user. The speaker may be in operational communication with a communication unit, allowing for the speaker to output sound wirelessly received by the communication unit wirelessly or by wired connection.

The first arm may comprise a microphone disposed at a distal tip. The microphone may be in signal communication with the communication unit and adapted to receive sound and wirelessly transmit it through the communication unit. The second arm may comprise a shield assembly adapted to engage the face of the user and create a barrier to prevent the receipt and transmission of air particles. The first arm and second arm are pivotably attached to the support band, whereby the microphone of the first arm and the shield assembly of the second arm may be proximate the mouth of the user in an engaged position, and then may be moved away from the mouth of the user to an inactive position. For example, if the user wishes to solely engage with the microphone of the first arm, the first arm may be configured in the engaged position, and the second arm may be pivoted downward or outward and away from the mouth. Alternatively, if the user wishes to solely engage the shield assembly of the second arm, the second arm may be configured in the engaged position, and the first arm may be pivoted downward or outward and away from the mouth.

In one embodiment, the first arm and second arm are removably attachable to the support band and adapted to be secured on either end of the support band. Thereby, the user may configure the communications headset system to feature the first arm on left side of the head and the second arm on the right side of the head, or it may switch the positions of the arms, whereby the second arm is on the left side of the head and the first arm is on the right side of the head.

In one example, the shield assembly comprises an inner face, an outer face, and a lining disposed between the inner face and the outer face. The lining may be adapted to trap, hinder or filter air particles that may contain infectious material. The inner face and outer face may comprise holes allowing for increased ventilation and breathability from within the shield assembly. The shield assembly may be transparent, allowing for the mouth of the user to still be viewed when the shield assembly is engaged. In another embodiment, the shield assembly may be opaque and may further feature a design or logo disposed on the outer face of the shield assembly. The shield assembly may be removably attachable to the second arm, allowing for the replacement of the shield assembly.

In another aspect, the support band is adapted to be secured about the neck of the user and supported by the collar of the user. The support band may wrap around the back of the neck of the user with opposite tips extending forward relative to the user. In this configuration, the speaker may extend vertically from the support band to a position proximate the ear of the user. The first and second arms may still be pivotable about the opposite tips of the support band and operate in a similar manner to the head-supported configuration of the communications headset system.

In another aspect, the communications headset system may comprise a wrist-mounted assembly. The wrist-mounted assembly may comprise a wrist band, a pivotable arm, and a mask assembly. The wrist band may be adapted to secure the wrist-mounted assembly to the forearm of the user via a strap that is tightened along the wrist or forearm of the user. The wrist band may further comprise two straps spaced apart along the forearm to increase stability of the wrist-mounted assembly. The pivotable arm of the wrist-mounted assembly may be pivotably attached to the wrist band at one end and the mask assembly at the other end. In a closed position, the pivotable arm may be substantially parallel with the forearm of the user. A user may manipulate the pivotable arm to an erect position by rotating the pivotable arm about the connection point with the wrist band, whereby the pivotable arm is substantially perpendicular to the fore arm of the user. The user may then lift the forearm to the face of the user to engage the mask assembly. The mask assembly of the wrist-mounted assembly may comprise the same elements and features as the shield assembly.

BRIEF DESCRIPTION OF DRAWINGS

Novel features of the present disclosure are set forth with particularity in the appended claims. However, the various embodiments of the present disclosure described herein, both as to organization and manner of operation, may be best understood by reference to the following description, taken in conjunction with the accompanying drawings in which:

DETAILED DESCRIPTION

Figure 1:
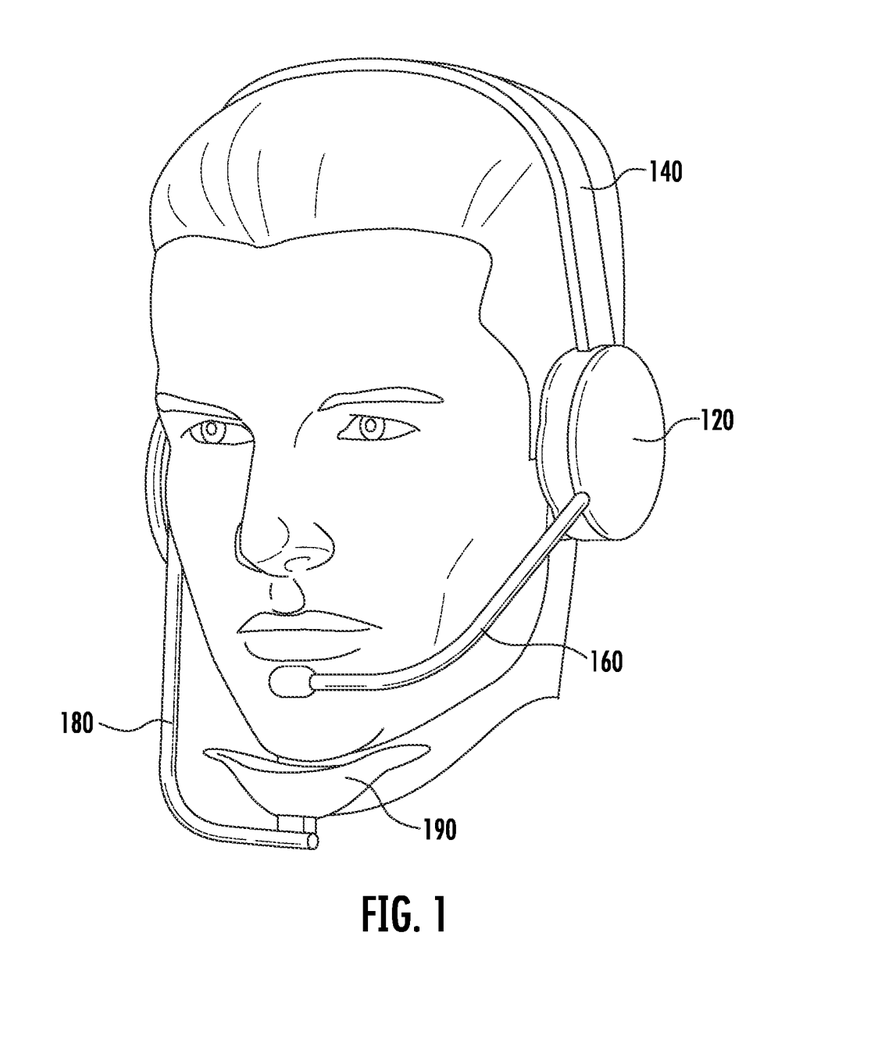
FIG. 1 is a perspective view of a communications system secured on a user in accordance with one embodiment of the present disclosure.

FIGS. 1-7 illustrate communications systems according to various embodiments of the present disclosure wherein like numbers identify like features. As shown in FIG. 1, a communications headset 100 may comprise at least one speaker 120, a support band 140, a first arm 160 and a second arm 180. In one embodiment, the support band 140 comprises a curved elongated body 142 with a first distal end 144 and a second distal end 146 disposed at opposite ends of the elongated body 142. The support band 140 is adapted to be secured about or rest upon a head of a user. The support band 140 may comprise a resilient material, such as a thermoplastic, whereby the curved shape of the elongated body 140 is maintained through multiple uses. The support band 140 may be dimensioned to comprise a curvature less than a typical width of a head of a user, whereby the communications headset 100 may be secured to the head of the user through tension created by the resilient material of the support band 140 attempting to return to its original shape.

In one embodiment, the speaker 120 is disposed at the first distal end 144 of the support band 140. When the communications headset is secured about the head of the user, the speaker 120 may be located proximate an ear of the user. As featured in FIG. 1, the communications headset 100 may further comprise an ear cover 122 coupled to the speaker and adapted to completely surround an ear of the user. The speaker 120 may be disposed within the ear cover 122 allowing a user to perceive sound output by the speaker. An outer edge of the ear cover 122 may be lined with a cushion material, such as a foam, memory foam, or padding, to provide comfort to the user when the communication headset 100 is secured about the head of the user.

Although the speaker 120 is disclosed as comprising an ear cover 122, the speaker 120 may comprise an earbud configuration, wherein the speaker 120 is directly inserted into an outer ear canal of a user. In another embodiment, the speaker 120 may comprise an open ear configuration, wherein the speaker 120 is disposed outside the ear canal and directed toward the ear canal. In yet another embodiment, the speaker 120 may utilize bone conduction technology known in the art, whereby vibrations are directed through the cheekbones and perceived as sound by the user.

In one embodiment, the communications headset 100 speaker 120 comprises a second speaker 120. The second speaker 120 may be located adjacent to the second distal end 146 of the support band 140 and adapted to provide sound output to the other ear of the user. Such a second speaker 120 may be provided within a second ear cover 122 or earbud configuration as described above In one embodiment, the first arm 160 is disposed proximate the first distal end 144 of the support band 140 and extends distally from the support band 140. The first arm 160 may comprise a slight curvature, whereby a distal tip of the first arm 160 may be positioned proximate to a mouth of the user when the communications headset 100 is in a secured position upon the head of the user. The first arm 160 may further comprise a microphone 162 disposed at the distal tip of the first arm 160 for detecting sound.

The communication headset 100 may include or operationally integrate, e.g., be in signal communication with, a communication unit 126 configured for operational communication with to speaker 120 and microphone. The communication unit 126 may include one or more wired and/or wireless receivers, transmitters, and/or transceiver configured to receive audio data from one or more communication points for input to speaker 120 for subsequent output by the speaker 120 into the ear of the user and to receive audio data collected by microphone 162 and transmit the collected audio data to one or more communication points, thereby allowing the communication headset 100 to receive and output audio communications at speaker 120 and transmit audio communications collected by the microphone 128.

The communication headset 100 may also include or electrically couple with a power supply 128 configured to supply power to the communication headset 100, which may include communications unit 126. The power supply 128 may include or receive a supply of electrical power via wired connection to a battery or residential power or via wireless transmission, as examples. However, the power supply 128 may include any suitable power supply and utilize any suitable supply of power. In one example, the power supply 128 may include one or more disposable batteries that may be replaced once power in the batteries is exhausted. In one example, the power supply 128 includes one or more rechargeable batteries, which may be recharged by connecting the batteries to an external power source. In one example, the communication headset 100 includes a connection for coupling to an external power source to recharge power supply batteries. In one embodiment, the power supply 128 comprises a supply or A/C or D/C power, e.g., residential A/C.

In one embodiment, one or both of a communication unit 126 or power supply 128 may be integrated within the support band 140 and/or the first and second arms 160, 180. In one example, the communication unit 126 and/or power supply 128 may be located within a housing proximate to speaker 120. In another embodiment, the communication unit 126 and/or power supply 128 may be located in one or more separate housings that is in operational communication with the speaker 120 and any other electrical components of the communications headset 100. In such an embodiment, the separate house may be attached to clothing of the user, such as a shirt or pants worn by the user, via a clip or other temporary fastener. The housing of the communication unit 126 and the power supply 128 within a separate housing may allow for a decrease in the size of the headset system 100, as additional space to accommodate the communication unit 126 and the power supply 128 within support band 140, first arm 160, or second arm 180 is not required.

As introduced above, the microphone 162 may be in operational communication with the communication unit 126, whereby a user may speak into the microphone 162 creating a sound input, the sound input may be sent to the communication unit 126, and the communication unit 126 may transmit the sound input to a receiver (not shown) via wired or wireless communication, e.g., radio (RF), microwave, optical, acoustic, or other wireless communication. Thus, through both the speaker 120 and the microphone 162, a user may communicate via wireless and/or wired connection with a third-party at or in signal communication with a recipient communication point.

In one embodiment, the second arm 180 is disposed proximate the second distal end 146 of the support band 140 and extends distally from the support band 140. The second arm 180 may also comprise a slight curvature, whereby a distal tip of the second arm 180 may be positioned proximate to a mouth of the user when the communications headset 100 is in a secured upon the head of the user.

The second arm 180 may further comprise a shield assembly 190. The shield assembly 190 may be adapted to cover the mouth and a nose of a user to prevent the spread and receipt of respiratory secretions that may contribute to the transmission of viruses, bacteria, or other microorganisms that may cause illness or disease. In one embodiment, the shield assembly 190 may completely enclose the mouth and nose of the user, whereby an outer edge of the shield assembly 190 is in continuous contact with the face of the user. In another embodiment, the shield assembly 190 is positioned in front of the face of the user without directly touching the face of the user. In this embodiment, the outer edge of the shield assembly 190 may be disposed approximately a half-inch from the face of the user, whereby the shield assembly 190 may still hinder, trap, or filter air particles expelled from the mouth of the user. In other examples, the shield assembly 190 may be configured to position between about 0.25 inches, about 0.75 inches, about 1 inch, or about 1.25 inches from the face of the user.

The shield assembly 190 may be attached at a connection point at a distal tip of the second arm 160. In one embodiment, the connection point along the second arm 180 positions the shield assembly at a fixed position relative to the second arm 180. In another embodiment, the connection point of the second arm 180 comprises a hinge 182, whereby the shield assembly 190 may be pivoted about the hinge 182 to proximate or engage the face of the user about the mouth and/or nose at a desired angle. In one embodiment, the shield assembly 190 is attached to the second arm 180 via a slidable connection that allows the position of the shield assembly 190 along the second arm 180 to be selectively adjusted by sliding the shield assembly 190 along the second arm 180. Alternatively, the shield assembly 190 may be attached along a length of the second arm 180.

In one embodiment, the first arm 160 and second arm 180 include a flexible cable or extension that may be selectively bent to allow the first arm 160 and second arm 180 to be positioned in differing configurations. For example, the flexible cable or extension of the first arm 160 may be configured to extend forwardly from the first distal end 144 of the support band 140 and curve centrally, whereby the distal tip of the first arm 160 would align proximate to the mouth of a user. The user may then apply force to the distal tip of the first arm 160 to straighten the first arm 160 away from the mouth of the user.

Figure 2A:
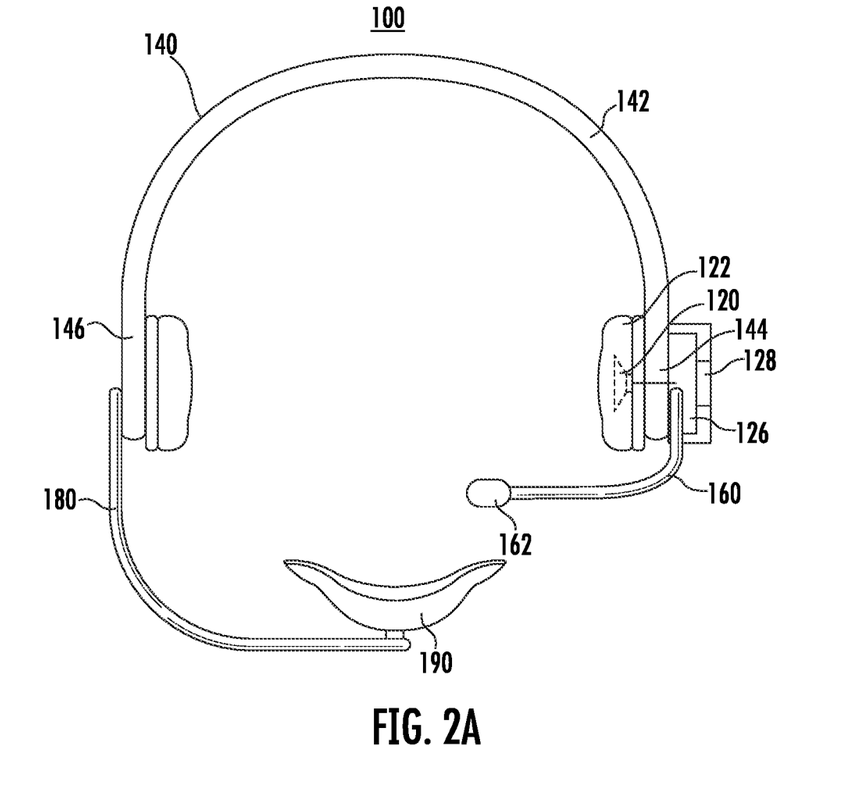
FIG. 2A is a front view of the communications system of FIG. 1 in a first configuration with a first arm in the engaged position and a second arm in an inactive position.
Figure 2B:
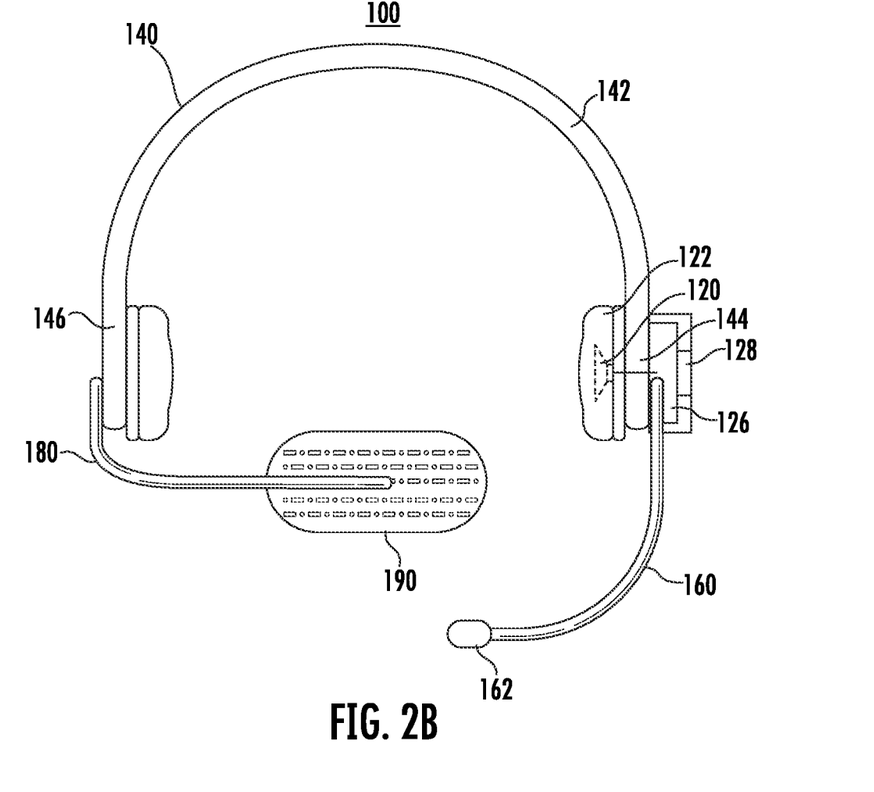
FIG. 2B is a front view of the communications system of FIG. 1 in a second configuration with a first arm in the inactive position and a second arm in an engaged position

In one embodiment, the first arm 160 and second arm 180 may comprise a rigid material that is pivotably hinged at connection points between the first arm 160 and the first distal end 144 the support band 140 and between the second arm 180 and the second distal end 144 of the support band 140. As shown in FIGS. 2A-2B, the first arm 160 and second arm 180 may be pivotable about a horizontal axis such that the first arm 160 and the second arm 180 may rotate upwardly and downwardly relative to the head of the user, whereby the first arm and second arm may be positioned proximate a top of the head of the user and positioned below the chin and near an upper chest of the user. FIG. 2A illustrates an embodiment of the communications headset 100 wherein the first arm 160 is in an engaged position and the second arm 180 is in an inactive position. When the first arm 160 is in the engaged position, the microphone 162 of the first arm 160 may be located proximate the mouth of the user. When the second arm 180 is in the inactive position, the shield assembly 190 of the second arm 180 may be located proximate the upper chest of a user. FIG. 2B illustrates a configuration of the communications headset 100 wherein the first arm 160 is in an inactive position and the second arm 180 is in an engaged position. When the second arm 180 is in the engaged position, the shield assembly 182 of the second arm 180 may be located proximate the mouth and nose of the user, completely enclosing the area to hinder the entrance and exit of airborne particles. When the first arm 160 is in the inactive position, the microphone 162 of the first arm 160 may be located proximate the upper chest of a user and away from the mouth of the user, thereby creating distance between microphone 162 and the mouth of the use so that unwanted sound input is not communicated through the microphone 162. Additionally or alternatively, the first arm 160 and/or second arm 160 may also be pivotable to inactive positions above the head of the user, e.g., above or adjacent to the support band 140 to achieve a similar effect. In one embodiment, the first arm 160 may only be pivotable between an engaged position in front of the mouth of the user and an inactive position above the head of the user, while the second arm 180 may only be pivotable between an engaged position covering the mouth of the user and an inactive position proximate the chest of the user, whereby the first arm 160 and second arm 180 would not collide when both arms 160, 180 are placed in the inactive position.

Figure 3:
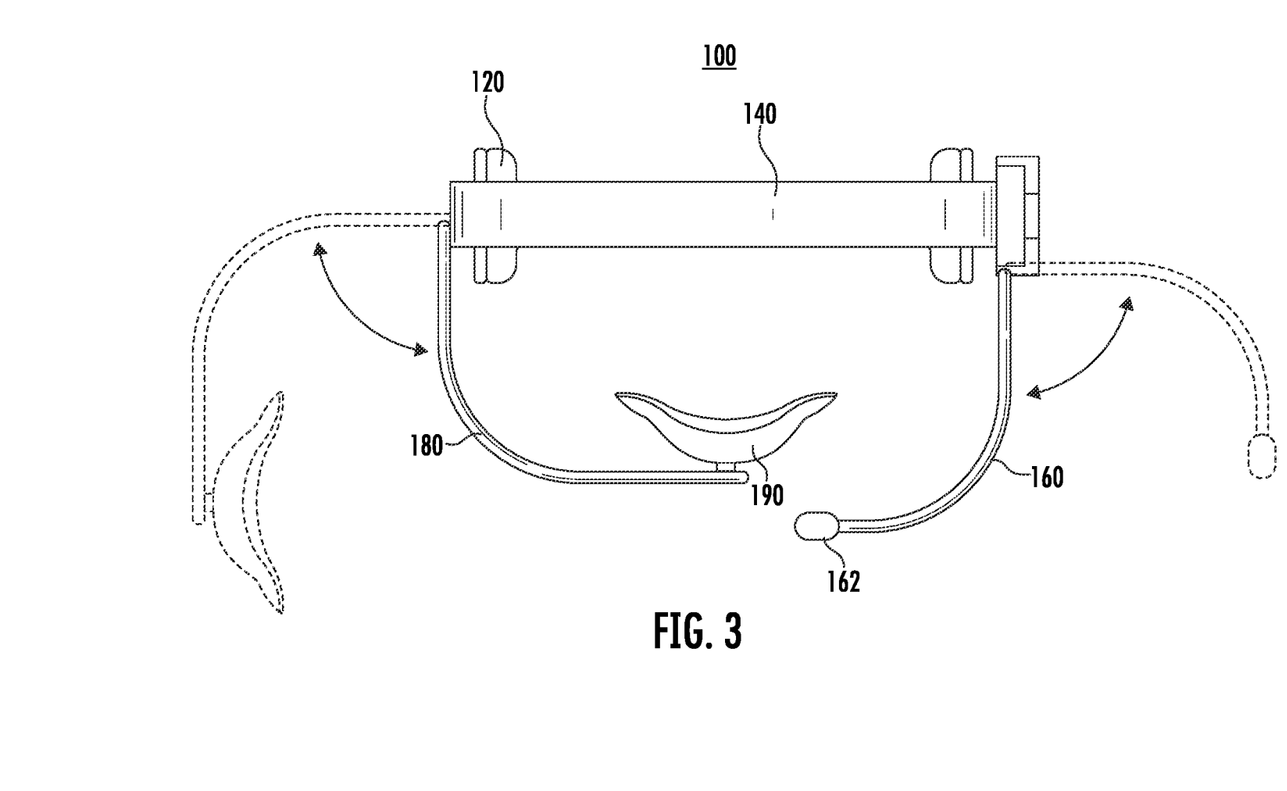
FIG. 3 is a top view of the communications system of FIG. 1.

In another embodiment, as shown in FIG. 3, the first arm 160 and second arm 180 may be pivotable about a vertical axis such that the first arm 160 and the second arm 180 rotate in an outward direction away from the mouth of the user, whereby, in an inactive position, the first arm 160 and second arm 180 may be positioned laterally to the side of the head of the user. The first arm 160 or the second arm 180 may then be rotated inward about its respective vertical axis to place the first arm 160 or the second arm 180 in the engaged position. It is within the scope of this disclosure that the communications headset 100 may employ both pivot systems, allowing for the pivoting of the arms 160, 180 upwardly/downwardly and outwardly.

Lengths of the first and second arms 160, 180 may be configured to position the microphone 162 and shield assembly 190 relative to the mouth of the users described herein. For example, in on embodiment, the first arm 160 and the second arm 180 may be approximately 10 inches in length, whereby the distal tip of the first arm 160 and the distal tip of the second arm 180 are dimensioned to be positionable approximately two inches in front of the mouth of the user when either are placed in the engaged position. In some embodiments, the second arm 180 is dimensioned to position the shield assembly 190 snugly around the mouth of the user. In a further embodiment, the second arm 180 is dimensioned to position the shield assembly 190 snugly around the mouth and nose of the user. In one embodiment, the first arm 160 may be slightly longer than the second arm 180 and extend further away from the support band 140 in a distal direction, whereby a travel path of the first arm 160 would not intersect a travel path of the second arm 180. In this configuration, both the first arm 160 and the second arm 180 may be placed in an engaged position simultaneously, wherein shield assembly 190 on the second arm 180 is positioned on or in front of the face of the user and the microphone 162 is positioned in front of the shield assembly. This configuration may allow a user to via the headset assembly 100 while also covering the nose and mouth of the user to prevent the transmission of air particles. In one embodiment, the first arm 160 may further comprise a top panel and a bottom panel disposed proximate the microphone 162. The top panel and bottom panel may be disposed along a top and bottom edge of the first arm, respectively. The top and bottom panels may be configured as rectangular plastic components extending in a vertical plane relative to and directly in front of the face of the user when the first arm 160 is in the engaged position. The top panel may be hinged at the top edge of the first arm and the bottom panel may be hinged at the bottom edge of the first arm 160, whereby the top and bottom panels may be rotated inward and be positioned in a horizontal plane relative to the user. A design or logo may be disposed on the top and bottom panels whereby the design or logo would be viewable when the first arm 160 is engaged and the top and bottom panels are positioned in their respective vertical positions. Such designs and logos may be used for advertising or sponsorship purposes. Additionally, the top and bottom panel may extend to a height, whereby the mouth of the user is completely obstructed from view, disallowing an outsider viewer from reading the lips of the user.

Figure 4:
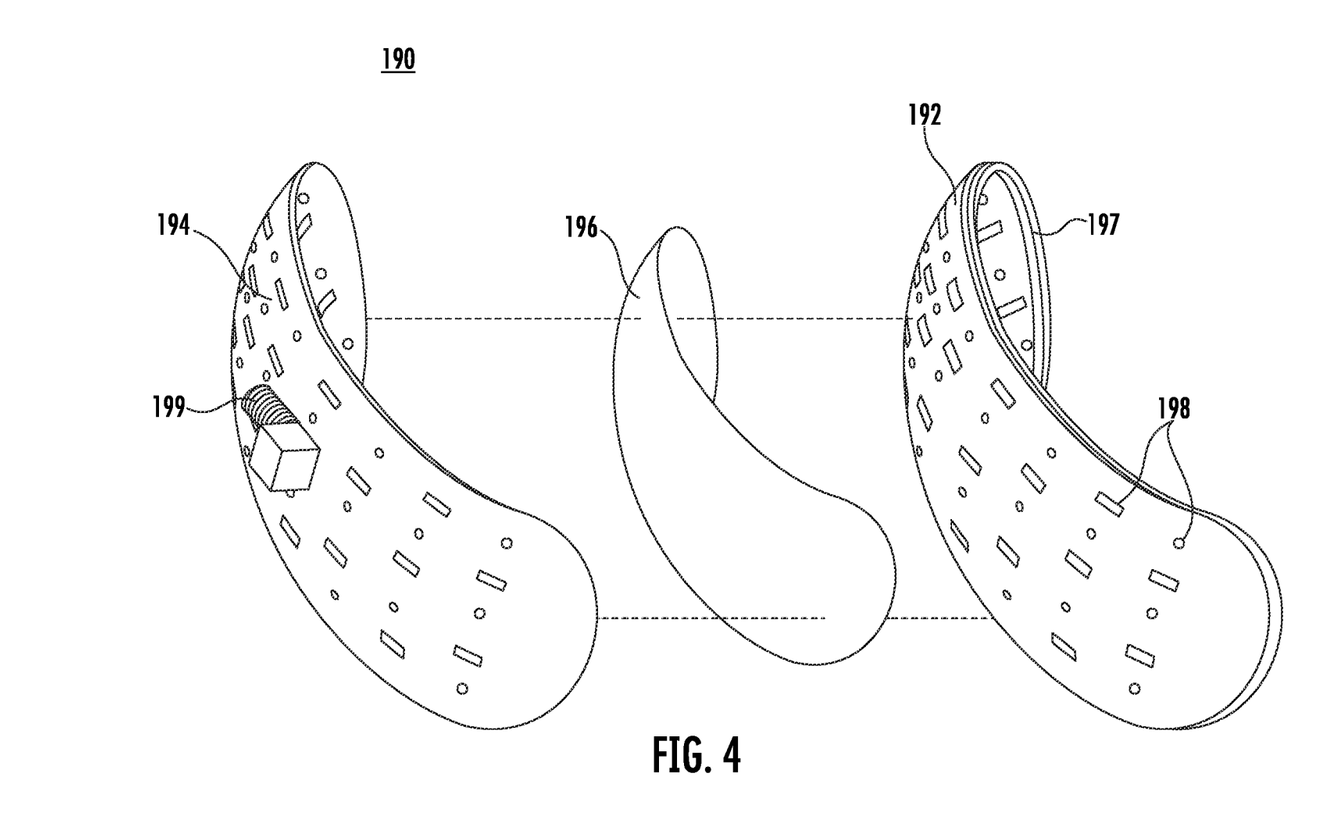
FIG. 4 is an exploded perspective view of the shield assembly according to one embodiment of the present disclosure.

With reference to FIG. 4, the shield assembly 190 may comprise an inner face 192 and an outer face 194. The shield assembly 190 may further comprise a preventative lining 196 configured to restrict or block airborne droplets, which may include aerosols, disposed between the inner face 192 and the outer face 194. The preventative lining 196 may be configured to filter air as it passes through the preventive lining 196. The inner face 192 and the outer face 194 may comprise a polymer or other suitable material, such as a plastic or thermoplastic. The preventative lining 196 may comprise cloth, paper, or a plastic material. In one example, the preventative lining 196 comprises a mesh material. The mesh material may be a medical mesh, specifically adapted for filtering, capturing, or preventing transmission of airborne disease. In one example, such a mesh may be coated in non-toxic material known to comprise disease resistant properties, such as copper. The preventative lining 196 may also comprise a respirator or other professional-grade material. The preventative lining 196 may be adapted to filter, capture, or hinder the transmission of air particles. The inner face 192, the outer face 194 and the preventative lining 196 may all comprise a recycled material. Additionally, the material may also be recyclable, allowing for the shield assembly 190 to be environmentally-friendly and producing minimal waste.

The inner face 192 and the outer face 194 may be comprised of corresponding holes 198 therethrough, allowing for increased ventilation and breathability within the shield assembly 190. In one embodiment, the holes 198 may be shaped as alternating circles and rectangles and are evenly spaced in rows extending a length of the shield assembly 190. The circular holes 198 may be approximately one-half inches in diameter and the regular holes 198 may be approximately one-half inches in length and one-quarter inches in height. The holes 198 may be configured in eight rows and six columns evenly spaced along the shield assembly. Alternatively, the holes 198 may be evenly spaced in a scattered configuration. Although described as uniform circles and rectangles, the holes 198 may comprise any shape and may vary in size and location.

In one embodiment, the inner face 192, outer face 194, and the preventative lining 196 are transparent, whereby a user's lips may be viewed from outside the shield assembly 190. In another embodiment, the inner face 192, outer face 194, and the preventative lining are opaque or partially opaque, whereby the lips of a user cannot be viewed from outside the shield assembly 190. In this embodiment, a logo or design may be featured on or integrated within the outer face 194. The logo or design may be printed or painted onto the outer face 194, or the outer face 194 may be a multi-color thermoplastic comprising the logo or design as an integral part of the thermoplastic or a separate layer therein. The use of a logo or design on the outer face 194 of the shield assembly 190 may be used for advertisement or sponsorship purposes or may be used to affiliate the user with a team or company.

The shield assembly 190 may be configured in an oblong shape, whereby the width of shield assembly 190 is slightly larger than its height, wherein the entire mouth and the nose of the user may reside within the shield assembly 190. The width of the shield assembly 190 may be approximately six inches in width and approximately four inches in height. In another embodiment, the shield assembly 190 may be configured in a triangular shape adapted to cover the nose and the mouth of the user. However, the shield assembly 190 may comprise any shape known in the art adapted to cover both the mouth and nose of the user.

An outside edge of the inner face 196 of the shield assembly 190 may comprise a foam cushion 197 to ensure continuous contact between the outside edge of the inner face 196 and the face of the user, while providing additional comfort at the points of contact. The foam cushion 197 may further comprise a cloth lining surrounding the entirety of the foam cushion to reduce friction between the foam cushion 197 and the face of the user, thereby alleviating any potential irritation caused to the user.

In one embodiment, the shield assembly 190 may be removably attachable from the second arm 180, thereby allowing for the replacement of a used shield assembly 190. The shield assembly 190 may comprise a clip disposed on the outer face 194 or on an outside edge adapted to clasp the second arm 180. The second arm 180 may further comprise a corresponding attachment point adapted to receive the clip of the shield assembly 180. In another embodiment, the second arm 180 may comprise a slot adapted to receive the a protrusion disposed on the outer face 194 or on an outside edge of shield assembly, whereby the protrusion of the shield assembly 190 may be slid into the slot of the second arm 180 to secure the shield assembly 190 in place. In yet another embodiment, as shown in FIG. 4, a threaded screw 199 may be disposed on the outer face 194 or on an outside edge of the shield assembly 190 and adapted to engage a threaded sleeve disposed on the distal tip of the second arm 180. Alternatively, the threaded slot may be disposed upon the outer edge or face of the shield assembly 190 and the threaded screw may be disposed on the second arm. However, any method of attachment known in the art may be employed to removably secure the shield assembly 190 to the second arm 180.

In another embodiment, the shield assembly 190 comprises a retaining mechanism attached to the second arm 180. The retaining mechanism may be adapted to receive and secure the shield assembly 190, a filter material, such as cloth, cotton or other fiber mesh, or the like, or pre-manufactured face coverings, such as N95 respirators, cloth masks, or paper masks. The retaining mechanism may comprise clamps adapted to grasp the shield assembly 190, filter material, or pre-manufactured face covering; prongs adapted to engage sleeves of the shield assembly 190, filter material, or pre-manufactured face covering; or a frame, whereby edges of the shield assembly 190, filter material, or pre-manufactured face covering may be slid into slots disposed on the frame. In one embodiment, the retaining mechanism comprises three horizontal bars aligned in a vertical plane spaced approximately two inches apart. The shield assembly 190 may be position between an upper bar and a middle bar, with another shield assembly also positioned between the middle bar and a lower bar. The shield assembly 190 may correspond with the size of the gaps between the upper, middle, and lower bars. The shield assembly 190 may thereby slide into grooves disposed on a bottom edge of the upper bar, a top and a bottom edge of the middle bar and a top edge of the lower bar.

In one embodiment, the communications headset 100 further comprises a loudspeaker whereby a user may speak into the microphone 162 and the sound may be amplified and projected through the loudspeaker. The loudspeaker may be positioned on the shield assembly 190 or adjacent to the microphone 162. In another embodiment, the communications headset 100 includes a second microphone within the shield assembly 190 and a loudspeaker. The loudspeaker may be configured to receive a sound input from the second microphone, whereby a user may speak into the second microphone and the sound may be amplified and projected through the loudspeaker. The loudspeaker may be disposed along the second arm 180. Alternatively, the loudspeaker may be disposed on the outer face 194 of the shield assembly 190. In another embodiment, the loudspeaker may be disposed in a separate housing in operational communication with the second microphone of the shield assembly 190. In one embodiment, the communications unit 126 may be adapted to wirelessly communicate with cellular telephones, including through the use of short-range wireless communication technology standard such as BLUETOOTH®. In this embodiment, the microphone 162 of the first arm 160 or the second microphone of the second arm 180 and the speaker 120 may be used as external microphones and speakers for a cellular telephone, thereby allowing a user to make and receive calls from a cellular telephone in proximity to the headset system 100. One or more buttons may be disposed at the first distal end 144 or the second distal end 146 that may correspond to powering the headset system 100, the raising of volume in the speaker 120, the changing of radio channels for the headset system 100, or other commands known in the art.

Figure 5:
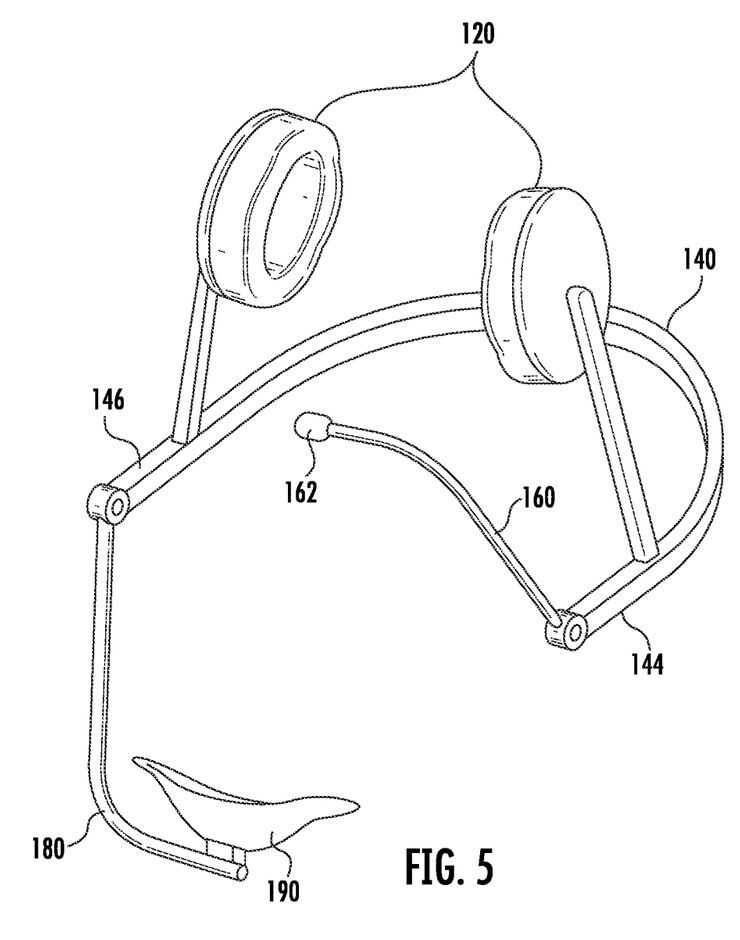
FIG. 5 is a perspective view of the communications system in accordance with a second embodiment of the present disclosure

In another embodiment, an example of which is shown in FIG. 5, the support band 140 may be comprised of a semi-rigid material and adapted to be supported by the neck and collar of user. The support band 140 may be configured in a semi-circular shape, whereby the elongated body 142 of the support band 140 is wrapped around a back of the neck of the user when worn and wherein the first distal end 144 and the second distal end 146 are proximate the front of the neck of the user. In one embodiment, only the second arm 180 comprising the shield assembly 190 is attached to the neck-supported support band 140, whereby the speakers 120 and the first arm 160 and microphone 162 are not present. In another embodiment, all features presented in the head-supported communications headset 100 are present. The one or more speakers 120 of the communications headset 100 may extend vertically from the support band 140 to a location proximate the ears of the user. The first arm 160 and the second arm 180 may be configured in a similar fashion to the head-supported communications headset 100 of FIGS. 1-3, whereby the first arm 160 and the second arm 180 are disposed at the first distal end 144 and the second distal end 146 of the support band 140, respectively. In this embodiment, the first arm 160 and the second arm 180 may be pivotable about an attachment point at the first distal end 144 and the second distal end 146 of the support band 140, respectively. The first arm 160 and the second arm 180 may extend substantially vertical when in an engaged position to a position proximate the mouth and nose of the user. In an inactive position, the first arm 160 and the second arm 180 may extend substantially downward and rest upon the chest of the user.

The support band 140 may comprise a semi-rigid metal adapted to be manipulated by the user to configure the support band 140 into a desired shape. Thus, the shape of the support band 140 may be changed to accommodate specific dimensions of the neck of the user currently wearing the communication headset 100.

In one embodiment, the first arm 160 and second arm 180 are removably attachable to the support band 140. In this embodiment, the first arm 160 may be removed to allow for the operation of the communications headset system 100 with solely the second arm 180 attached or the second arm 180 may be removed to allow for the operation of the communications headset system 100 with solely the first arm 160. In one embodiment, the first arm 160 and second arm 180 may also be removably attachable and configured to receive the opposite distal end of the support band 140, whereby the first arm 160 and the second arm 180 may switch sides relative to the head of the user. For example, if a starting configuration of the communications headset 100 comprises the first arm 160 disposed to the left of the head and the second arm 180 to the right of the head, and a user prefers the shield assembly 190 of the second arm 180 to the left of the head, the user may detach the first arm 160 and the second arm 180 from the support band 140 and reattach the second arm 180 to the left of the head and the first arm 160 to the right of the head.

Figure 6:
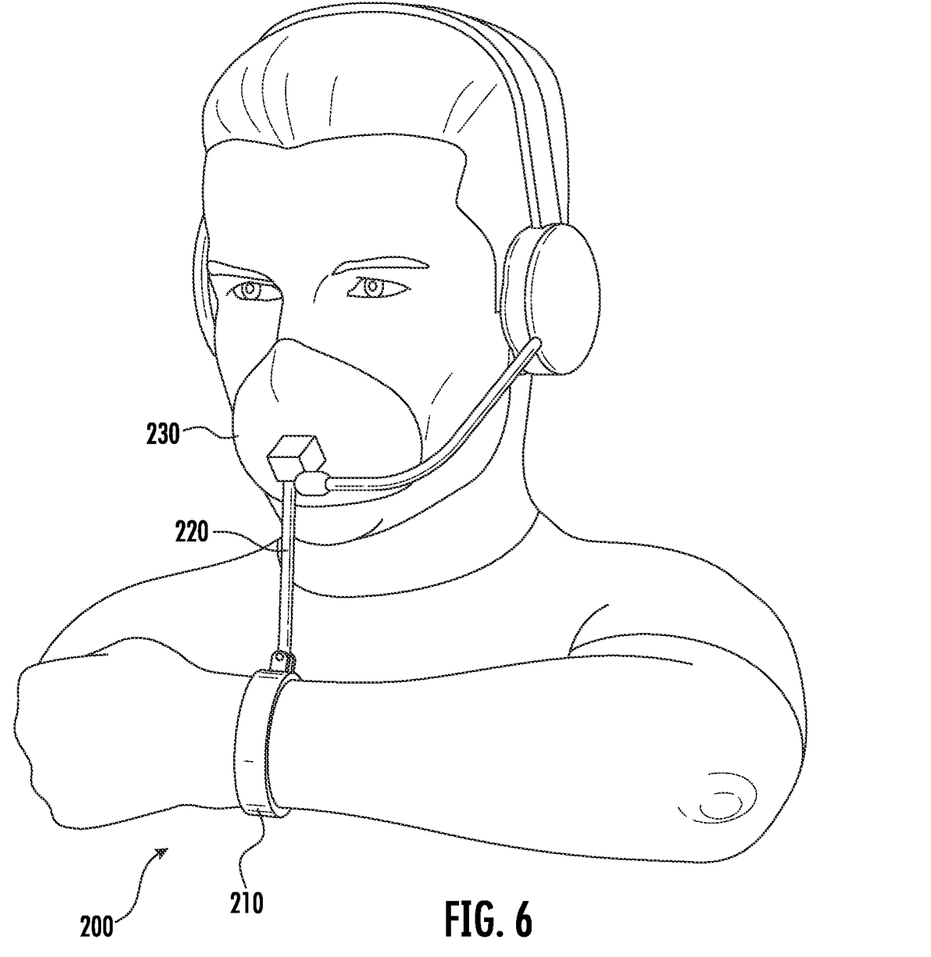
FIG. 6 is a perspective view of a wrist-mounted communications system in accordance with a third embodiment of the present disclosure.

With reference to the example embodiment of FIG. 6, a wrist-mounted shield assembly 200 is disclosed. In one embodiment, wrist-mounted shield assembly 200 comprises a wrist band 210, a pivotable arm 220, and a mask assembly 230. The wrist band 210 is adapted to secure the wrist-mounted shield assembly 200 to the forearm of a user. The pivotable arm 220 is secured to an outer face of the wrist band 210 at a connection point and the mask assembly 230 is disposed on an opposite end of the pivotable arm 220. In one embodiment, the connection point is a simple pin joint allowing for a single degree of rotation. In another embodiment, the connection point between the pivotable arm 220 and the wrist band 210 allows for multiple degrees of freedom, whereby the arm may be positioned in different configurations.

Figure 7A:
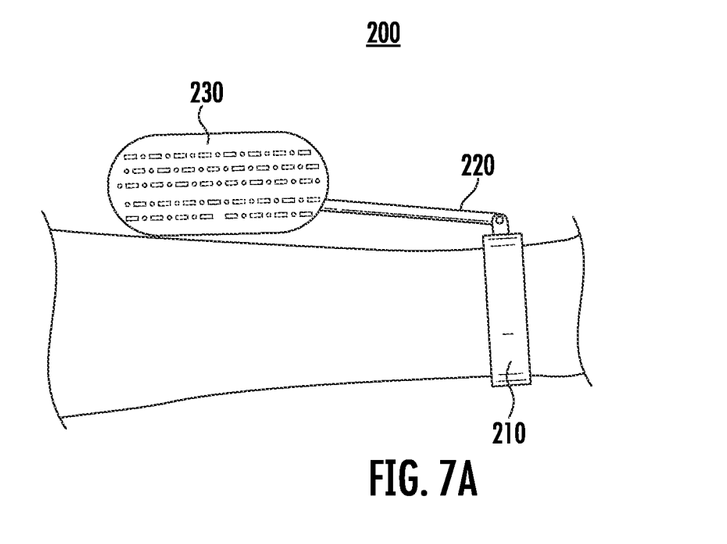
FIG. 7A is a perspective view of the communications system in a closed position in accordance with an embodiment of the present disclosure.
Figure 7B:
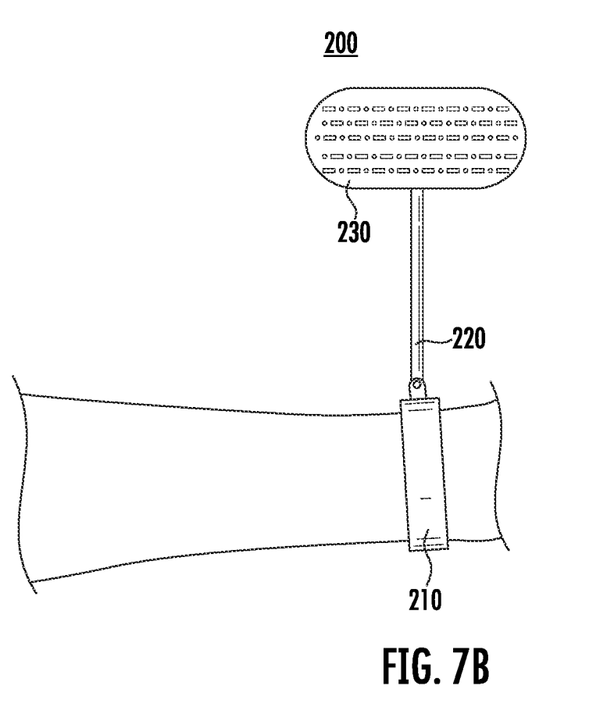
FIG. 7B is a perspective view of the communications system in a closed position in accordance with an embodiment of the present disclosure

In a closed position, as depicted in FIG. 7A, the pivotable arm 220 may be aligned approximately parallel with the arm of the user, with the mask assembly 230 located at an upper area of the forearm. As shown in FIG. 7B, the pivotable arm 220 may be rotated about the connection point to an erect position, whereby pivotable arm 220 is positioned perpendicular to the forearm of the user. In the erect position, the user may lift the fore arm near the face of the user to engage the mask assembly 230 against the face of the user. The mask assembly 230 may comprise a similar configuration and similar features to the shield assembly 190 of the previous embodiments. In one embodiment, a connection point between the pivotable arm 220 and the mask assembly 230 may comprise a hinge, whereby the mask assembly 230 may pivot relative to the pivotable arm 220 to allow for ease of use and more versatility when the mask assembly 230 is engaged with the face of the user.

In the erect position, a user may lift its arm to a height below its chin and position the mask assembly 230 to press against the face of the user to completely cover the nose and mouth of the user. The pivotable arm 220 may be approximately eight inches in length. In one embodiment, the pivotable arm 220 may be telescoping, whereby the length may be increased or decreased depending on the preference of the user. In one embodiment, the pivotable arm 220 may further comprise a second joint along its length, whereby the pivotable arm 220 may fold upon itself. In this embodiment, the mask assembly 230 may be positioned proximate the wrist of the user when in the closed position. The wrist band 210 may be positioned proximate the wrist of the user and comprise a single strap that is secured about the wrist. In another embodiment, the wrist band 210 may comprise multiple straps connected by a connection rod running the length of the forearm of the user, thereby increasing the stability of the wrist-mounted shield assembly 200. The wrist-mounted shield assembly 200 may further comprise a third microphone and radio components in operational communication with the headset assembly 100, whereby sound input through the third microphone may be transmitted to the communication unit 126 of the communications headset 100. The one or more straps of the wrist band 210 may comprise hook and loop fasters, whereby the strap may be wrapped around the wrist or forearm of the user and a portion of the strap comprising hooks may be compressed against a portion of the strap comprising loops, thereby securing the one or more straps in place. Alternatively, the one or more straps may be comprised of an elastic fabric, such as conventional cotton wristbands, that are stretched, slid over wrist, and secured on the forearm via compression caused by an elastic force of the fabric.

Any references to "various embodiments," "certain embodiments," "some embodiments," "one embodiment," or "an embodiment" generally means that a particular element, feature and/or aspect described in the embodiment is included in at least one embodiment. The phrases "in various embodiments," "in certain embodiments," "in some embodiments," "in one embodiment," or "in an embodiment" may not refer to the same embodiment. Furthermore, the phrases "in one such embodiment" or "in certain such embodiments," while generally referring to and elaborating upon a preceding embodiment, is not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

It is to be appreciated that persons having ordinary skill in the art, upon considering the descriptions herein, will recognize that various combinations or sub-combinations of the various embodiments and other elements, features, and aspects may be desirable in particular implementations or applications. However, because such other elements, features, and aspects may be readily ascertained by persons having ordinary skill in the art upon considering the description herein, and are not necessary for a complete understanding of the disclosed embodiments, a description of such elements, features, and aspects may not be provided. As such, it is to be understood that the description set forth herein is merely exemplary and illustrative of the disclosed embodiments and is not intended to limit the scope of the invention as defined solely by the claims.

What is claimed is:

1. A communication headset system comprising:
    a headset, the headset comprising at least one speaker, a support band, a first arm and a second arm,
    the support band comprising a first distal end and a second distal end disposed on opposite ends of the support band, wherein the support band is adapted for stabilizing the communication device;
    the first arm pivotably attached to and extending distally from the first distal end of the support band;
    the second arm pivotably attached to and extending distally from the second distal end of the support band, wherein the first and second arms are separately pivotable independent of each other;
    a microphone disposed at a distal tip of the first arm opposite the attachment to the first distal end of the support band;
    the second arm comprising a shield assembly attached to a distal tip of the second arm opposite the attachment to the second distal end of the support band, the shield assembly comprising an outer face and an inner face, wherein the shield assembly is adapted to obstruct the transmission and receipt of air particles and fit over the nose and mouth of a user;
    wherein the shield assembly attached at the distal tip of the second arm is removably attachable; and
    a communication unit in operational communication with the speaker and the microphone.

2. The communication headset system of claim 1, wherein the support band is adapted to be secured about a head of the user.

3. The communication headset system of claim 1, wherein the support band is adapted to be secured about a neck of a user.

4. The communication headset system of claim 1, wherein an intermediate material is disposed between the outer face and the inner face of the shield assembly.

5. The communication headset system of claim 4, wherein the intermediate material is a cloth material.

6. The communication headset system of claim 4, wherein the intermediate material is a medical-grade material.

7. The communication headset system of claim 1, wherein the shield assembly comprises a screw disposed on the outer face of the shield assembly, whereby the screw is adapted to engage a threaded slot disposed at the distal tip of the second arm.

8. The communication headset system of claim 1, wherein the first arm and second arm are removably attachable from the support band.

9. The communication headset system of claim 8, wherein the first arm is adapted to attach to the second distal end of the support band, and the second arm is adapted to attach to the first distal end of the support band.

10. The communication headset system of claim 1, wherein the shield assembly is comprised of a recyclable material.

11. The communication headset system of claim 1, wherein the shield assembly is transparent.

12. The communication headset system of claim 1, wherein the shield assembly is opaque.

13. The communication headset system of claim 1, wherein the outer face and the inner face of the shield assembly comprises a plurality of holes.

14. The communication headset system of claim 13, wherein the plurality of holes comprise circular holes and rectangular holes.

15. The communication headset system of claim 14, wherein the plurality of holes wherein the circular holes are approximately one-half inch in diameter and the rectangles are approximately one-half inch in width and one-quarter inch in height.

16. The communication headset system of claim 14, wherein the plurality of holes are arranged in separate rows alternating between circular holes and rectangular holes.

17. The communications headset system of claim 1, wherein the shield assembly further comprises a cushion material disposed on an outer edge of the inner face of the shield assembly.

18. The communications headset system of claim 1, wherein sides of the shield assembly are configured to form a seal between the sides of the shield assembly and face of the user to prevent air flow therebetween.

19. The communications headset system of claim 1, wherein the first arm and the second arm are pivotable in an upward and downward direction and an inward and outward direction.

* * * * *